United States Patent [19]

Casparian

[11] Patent Number: 5,450,549
[45] Date of Patent: Sep. 12, 1995

[54] MULTI-CHANNEL IMAGE ARRAY BUFFER AND SWITCHING NETWORK

[75] Inventor: Mark A. Casparian, Poughkeepsie, N.Y.

[73] Assignee: International Business Machines Corporation, Armonk, N.Y.

[21] Appl. No.: 389,450

[22] Filed: Feb. 16, 1995

Related U.S. Application Data

[63] Continuation of Ser. No. 865,573, Apr. 9, 1992.

[51] Int. Cl.⁶ ............................................... G06F 15/16
[52] U.S. Cl. ................................. 395/250; 395/163; 395/280
[58] Field of Search .......................................... 395/250

[56] References Cited

U.S. PATENT DOCUMENTS

| | | | |
|---|---|---|---|
| 3,626,382 | 12/1971 | Pedersen | 395/163 |
| 4,511,965 | 4/1985 | Rajaram | 395/27 |
| 4,674,064 | 6/1987 | Vaughn | 364/900 |
| 4,742,240 | 5/1988 | Yamanishi et al. | |
| 4,800,431 | 1/1989 | Deering | 358/160 |
| 4,877,326 | 10/1989 | Chadwick et al. | |
| 4,916,301 | 4/1990 | Mansfield et al. | 345/133 |
| 4,947,380 | 8/1990 | Van Zanten et al. | |
| 4,949,280 | 8/1990 | Littlefield | 395/163 |
| 5,012,344 | 4/1991 | Goto | |
| 5,027,218 | 6/1991 | Ueda | |
| 5,107,265 | 4/1992 | Sloane | 341/146 |
| 5,109,520 | 4/1992 | Knierim | 395/800 |
| 5,230,064 | 7/1993 | Kuo et al. | 395/162 |
| 5,247,612 | 9/1993 | Quinard | 395/166 |
| 5,291,275 | 3/1994 | Lumelsky | 348/441 |
| 5,291,459 | 3/1994 | Anderson | 367/134 |

FOREIGN PATENT DOCUMENTS 3229777 8/1982 Germany.
1243182 1/1989 Japan.

*Primary Examiner*—Robert B. Harrell
*Assistant Examiner*—Brian Ledell
*Attorney, Agent, or Firm*—Whitham, Curtis, Whitham & McGinn; Charles W. Peterson

[57] ABSTRACT

A multi-port buffer stores digitized image and/or audio information from a video camera and transfers the stored image information to a plurality of output channels. Digitized input data is passed through a crossbar switch and stored in a random access memory (RAM). The image data is retrieved from RAM and passed the crossbar switch to one of a plurality of first-in, first-out (FIFO) registers. Raster scan lines are passed from the FIFO registers to corresponding output channels. The order and rate of writing to RAM and reading out to the FIFO registers is controlled by an asynchronous queuing arbiter. If one of the output channels is slower than the others or operates at a variable clock speed, the asynchronous queuing arbiter changes the order in which the FIFO registers are filled to accommodate that output channel. Should one of the output channels fail, the bus request for the corresponding FIFO register is disabled, thereby skipping the failed channel.

4 Claims, 14 Drawing Sheets

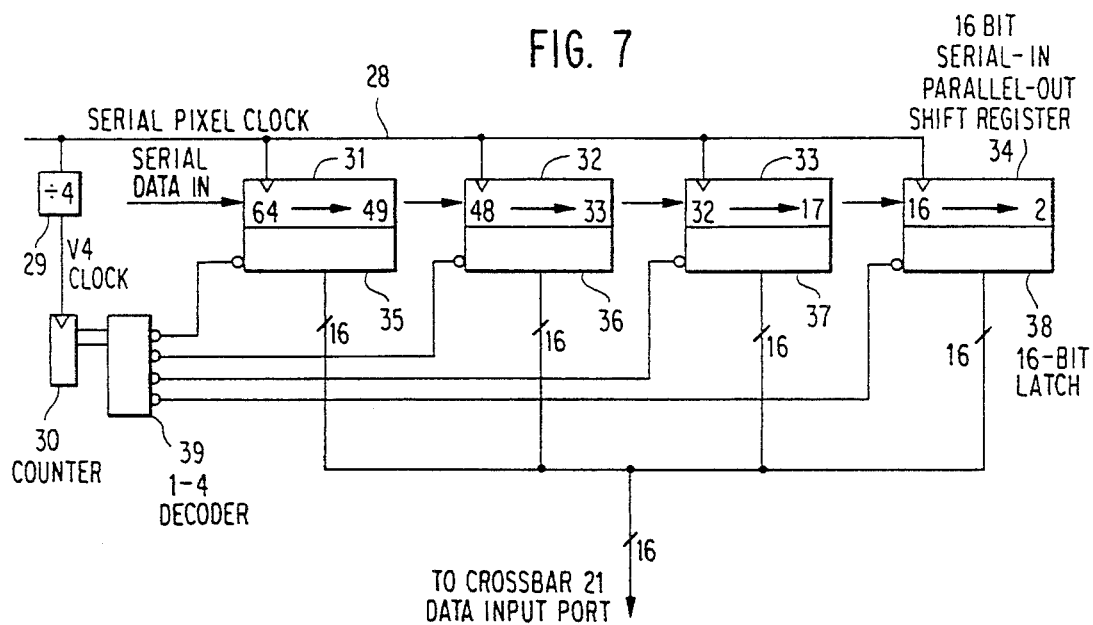
FIG. 7
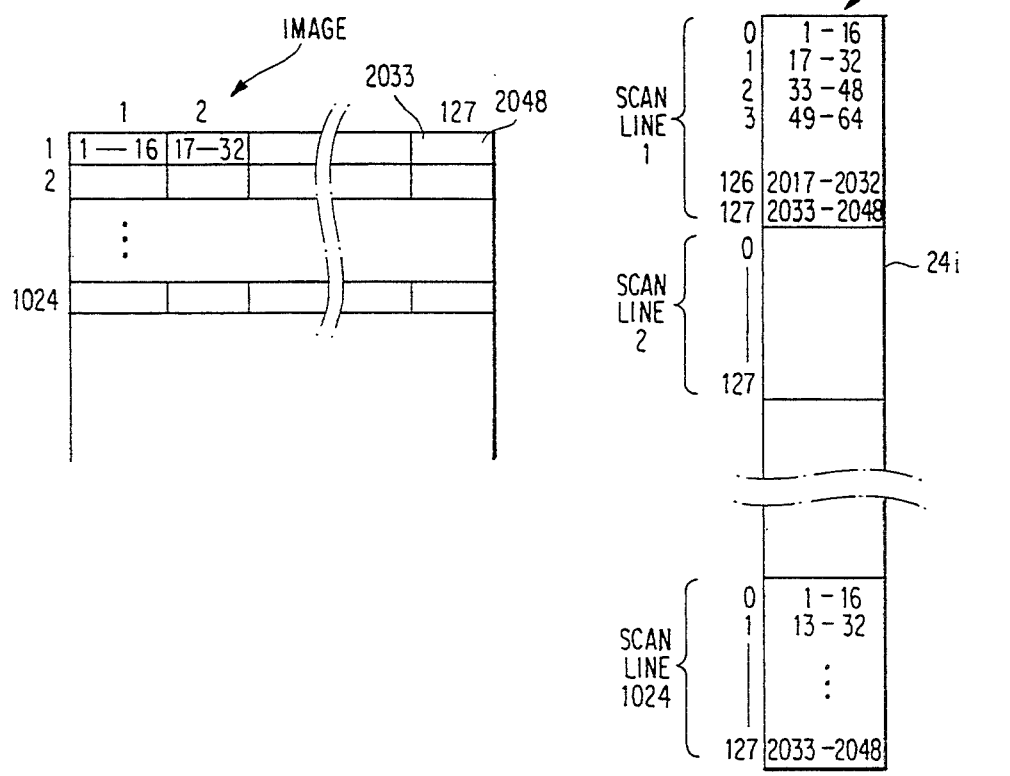
FIG. 8A
FIG. 8B

BARREL-ROLL
(TO ACCOMMODATE
VERTICAL SCROLLING)

STATE MACHINE OF TIBPSG507 (47)

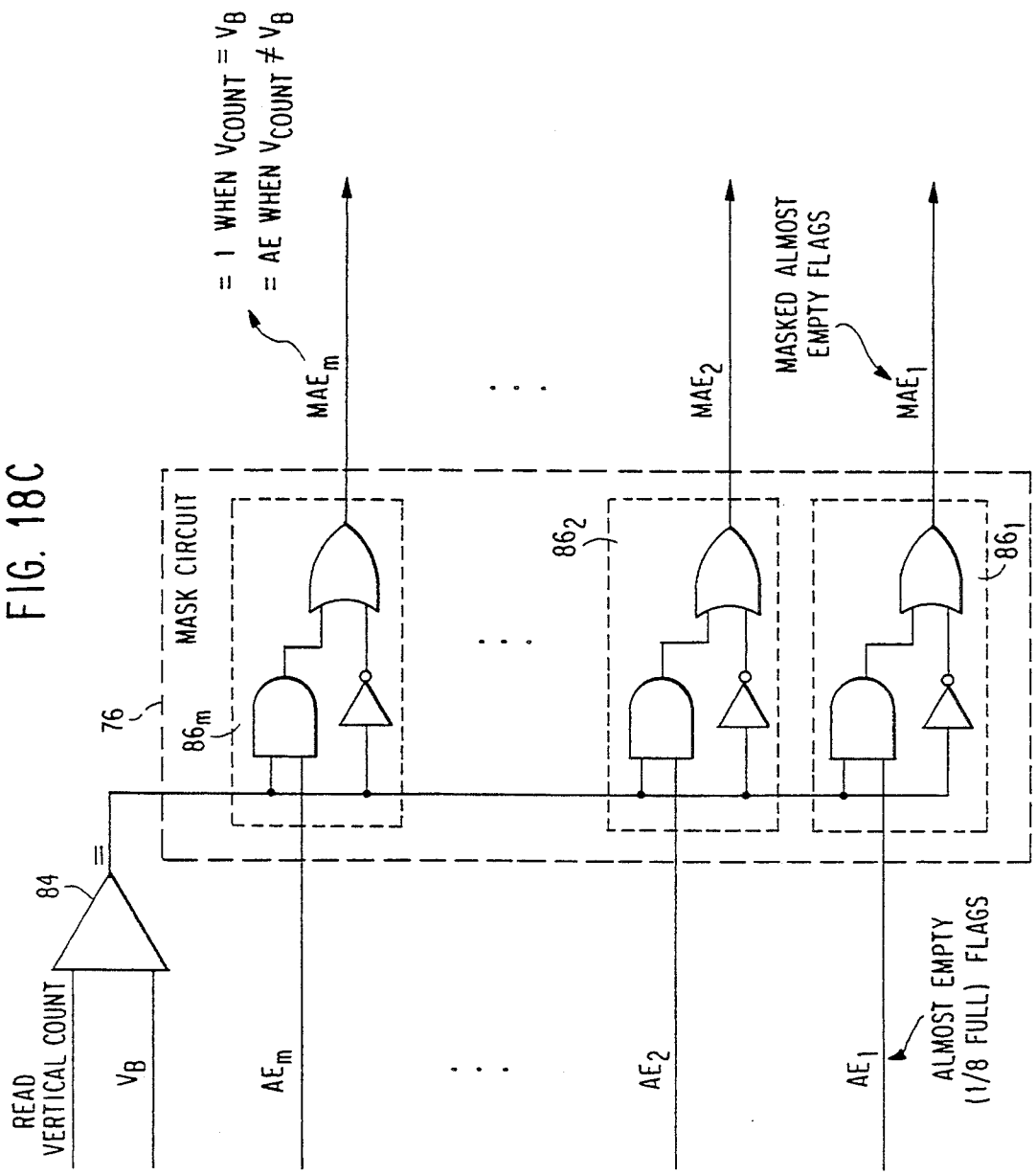

MULTI-CHANNEL IMAGE ARRAY BUFFER AND SWITCHING NETWORK

CROSS-REFERENCE TO RELATED APPLICATION

This application is a continuation of application Ser. No. 07/865,573, filed Apr. 9, 1992, now abandoned.

BACKGROUND OF THE INVENTION

1. Field of the Invention

The present invention generally relates to video image processing and, more particularly, to an image buffer architecture which is capable of providing multiple image frames or "snapshots" simultaneously, either to a plurality of image processors or to multiple locations within a computer system, providing a highly flexible image data input/output buffering system.

2. Description of the Prior Art

Image capture and processing systems are used in a diverse variety of systems from manufacturing inspection systems to multimedia presentation systems. Typically, such systems employ a video camera to generate an analog signal of a raster scanned image. One or more frames of this analog signal is digitized and stored in an image buffer. The combination of the analog-to-digital (A/D) converter and the image buffer is often packaged on a single printed circuit board (PCB) and sold in the trade as a "frame grabber", meaning that the board is capable of "grabbing" (i.e., storing) a video frame. A portion of a stored frame, termed the region of interest (ROI), may be addressed and read out for processing.

In an inspection system, an object may be scanned a number of times to provide a sequence of frames. The image processor analyzes the data which constitutes the ROI in each frame as a series of "snapshots" in order to detect and provide information indicative of selected variations within the ROI. In this way the locations of object defects are determined. In a multimedia system, the scanned image may be manipulated, enhanced or converted, depending on the final presentation format.

In current image processing systems, the video frame buffer (i.e., frame grabber cards) are a speed bottleneck to overall system performance. Two things affect the transmission of the video image data; the architecture and bandwidth of the video frame buffer and the bandwidth of the data bus or local area network (LAN) used to communicate the image data. The fundamental flaw in the prior art is in the video frame buffer architectures. Current frame buffers place the burden of bandwidth limitations in the data bus and/or the LAN by transporting image data in and out of various boards and/or memory along the data bus or LAN serially.

A typical configuration is illustrated in FIG. 1, in which a video camera 10 provides an analog video signal to a frame grabber 11 which digitizes and temporarily stores a frame of video data. This digitized video data is supplied via the data bus 12 of a personal computer (PC) to other functional components which are also interfaced with the bus 12. The bus 12 may be any of the several industry standards such as the Microchannel bus of IBM PS/2 PCs, the so-called ISA (for industry standard architecture as adopted by the IEEE) bus or the EISA (for extended ISA) bus. The digitized data from frame grabber 11 is delivered via bus 12 to a data compression card 13 which, in turn, outputs compressed data, again via bus 12, to the central processor unit (CPU) random access memory (RAM) 14. The data in RAM 14 may be displayed by sending it, via bus 12, to the display adapter card 15 which drives a display device 16, such as a cathode ray tube (CRT) monitor. In addition, the image data in RAM 14 may be transmitted on a local area network (LAN). To do so requires that the data in RAM 14 be transferred, again via bus 12, to a LAN adapter card 17 which formats the data into packets for transmission.

SUMMARY OF THE INVENTION

It is therefore an object of the present invention to provide an image buffer architecture which supports wide bandwidth image processing independent of the data bus or LAN.

It is another object of the invention to provide an image buffer having a multi-port output which allows asynchronous and simultaneous read out of image data.

It is a further object of the invention to provide a multi-port image buffer which can accommodate variable output rates of image data and can be programmed to skip a failed output device.

According to the invention, there is provided an image buffer in the form of a unique multi-ported video memory architecture. Rather than placing the bandwidth burden on the data bus or LAN, the bandwidth burden is placed within the video memory card. This unique architecture is capable of sending multiple images out of the card simultaneously and in parallel, whereas the current art is capable of sending only one image output at a time. Each of the image outputs can go to a respective image processor, as might be the case for an industrial image inspection system or image processing system, or to respective areas within a computer system. With multiple outputs occurring in parallel and simultaneously, system throughput performance is greatly improved. In the case of an industrial image inspection system, by using this invention, system throughput can be increased from 20 MHz to 200 MHz by simply providing ten image outputs (20 MHz each). The architecture allows the use of off-the-shelf image processing equipment designed for 20 MHz, without having to design highly technical, and sometimes risky, 100 MHz CPU cards. In the case of a multimedia system, providing multiple images to multiple areas within the PC relieves throughput bottlenecks notoriously experienced by multimedia users to support real-time video along LANs such as Token Ring and Ethernet.

The image buffer according to the invention accepts the camera input from a crossbar switch. The crossbar switch allows camera data to be written to random access memory (RAM), as well as reading data out of the RAM simultaneously to a bank of first-in, first-out (FIFO) registers. Each FIFO register corresponds to an output channel supplying one of the outputs of the image buffer. The order and rate of writing to RAM and reading out to the FIFO registers is controlled by an asynchronous queuing arbiter. If one of the output channels is slower than the others or operates at a variable clock speed, the asynchronous queuing arbiter changes the order in which the FIFO registers are filled to accommodate that output channel. Should one of the output channels fail, the bus request for the corresponding FIFO register is disabled, thereby skipping the failed channel.

BRIEF DESCRIPTION OF THE DRAWINGS

The foregoing and other objects, aspects and advantages will be better understood from the following detailed description of a preferred embodiment of the invention with reference to the drawings, in which:

FIG. 7 is a block diagram showing the basic structure of the input shift register and latch circuitry which interfaces input digital data to the crossbar switch shown in FIG. 2;

FIG. 8A is an illustration of a scanned image and FIG. 8B is a representation of a RAM module showing how image data is stored in the RAM module;

FIGS. 18A, 18B and 18C, taken together, form a block diagram of the asynchronous queuing arbiter according to a preferred embodiment of the invention.

DETAILED DESCRIPTION OF A PREFERRED EMBODIMENT OF THE INVENTION

Figure 1:
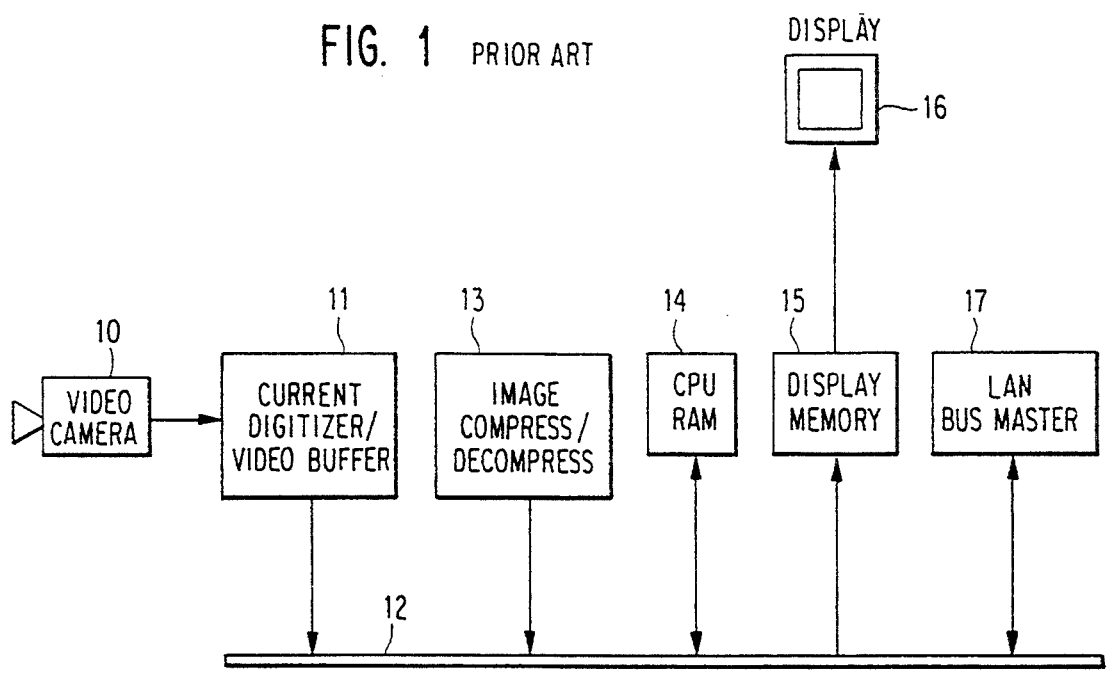
FIG. 1 is a partial block diagram of a personal computer using a conventional frame grabber to digitize and temporarily store analog image data from a video camera.
Figure 2:
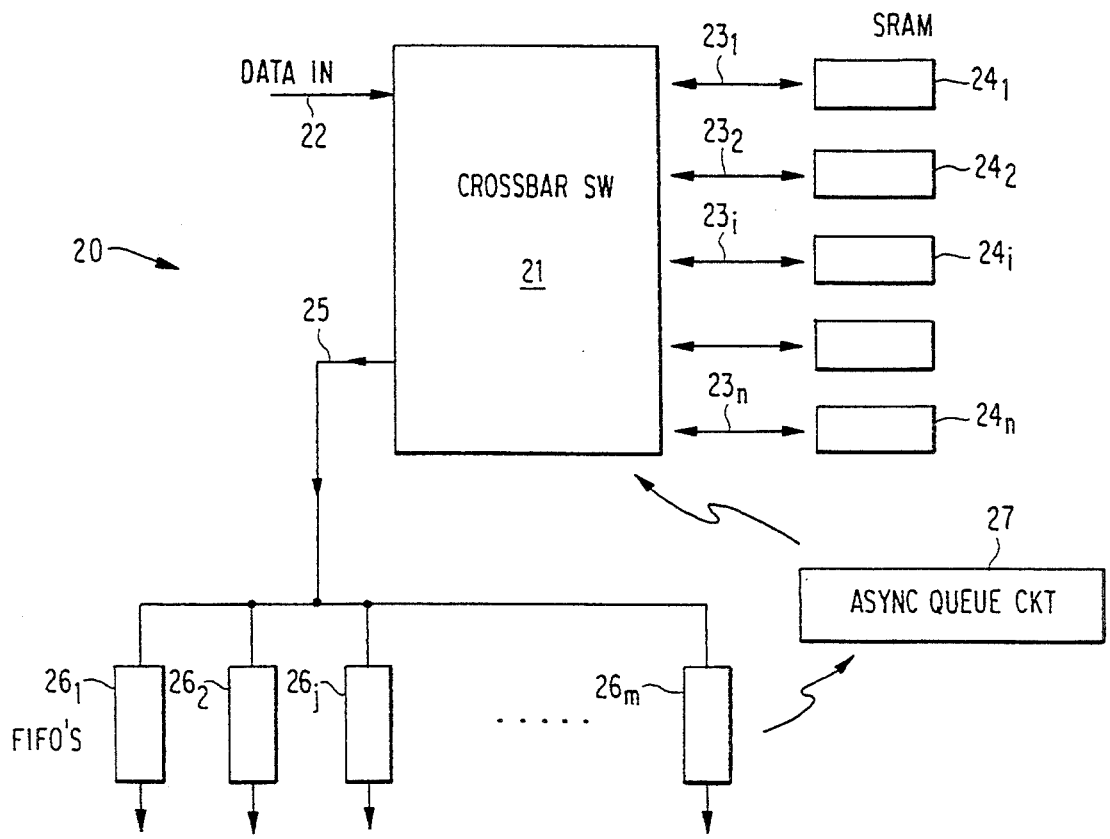
FIG. 2 is a functional block diagram illustrating the inputs and outputs of the image buffer according to the invention.

Referring now to the drawings, and more particularly to FIG. 2, there is shown a functional block diagram providing an overview of the unique multi-ported video buffer architecture according to the invention. The multi-ported video buffer 20 consists of a digital crossbar switch 21 with an input port 22 which can be connected to any of the ports $23_1$ to $23_n$. The input port 22 receives digital data from an analog-to-digital (A/D) converter (not shown). The A/D converter can be used to digitize analog image data from a camera and/or analog sound information from a microphone. The digitized data from the input port 22 is connected via one of the ports $23_i$ to a corresponding RAM module $24_i$ of a plurality of RAM modules $24_1$ to $24_n$. In the preferred embodiment, the RAM modules are composed of static random access memory (SRAM) devices. Another crossbar port 25 is directly wired to multiple FIFO registers $26_1$ to $26_m$. This port 25 is the output from the crossbar switch 21. Each FIFO register $26_j$ is used for a single video (or audio) channel output. The number of FIFO registers is extendable to accommodate many channel outputs. The order and rate at which data is read out of the RAM modules to the FIFO registers is controlled by an asynchronous queuing arbiter 27 which monitors flags from the FIFO registers.

The crossbar switch's main purpose is to break up a "shared image buffer" into an n-ported RAM, namely RAM modules $24_1$ to $24_n$. It is assumed that of the total image being loaded into input port 22 of the crossbar switch 21, the region of interest (ROI) images to be sent out of output port 25 are a subset of the total image. The various ROI images may overlap one another, and they may each overlap into more than one RAM module. Depending on the application, various ROI images may be of different sizes. Some may fit within one RAM module, some in multiple RAM modules. The more RAM modules supported from the crossbar switch, or the more crossbar switch ports tied to a RAM module, the less chance there is for RAM access contention where data will be written into a RAM module from which data is also being read. The fewer the number of RAM modules, the greater the chance for contention for a RAM module for simultaneous write and read access. This assumes, of course, off-the-shelf SRAMs with a single port input/output (I/O). High-speed image processing applications, where pixel clock rates start at 20 MHz and go up beyond 100 MHz, SRAMs for modules $24_1$ to $24_n$ are most desirable. Typically, for slower clock rates (i.e., video related rates, video graphics array (VGA), video camera, etc.), Video RAMs (VRAMs) or Dynamic RAMs (DRAMs) could be used for RAM modules $24_1$ to $24_n$.

To ensure reliable operation on the basis of system input/output throughputs, the multi-port video buffer 20 takes in N inputs at a rate of $I_r$ and outputs M outputs, each at a rate of $O_{ri}$ where the combined output rate is and the following relationship is satisfied:

$$(N)(I_r) \leq (M)(O_r).$$

This rule is the main determining factor as to how many simultaneous output channels can be supported with this architecture. It really depends on input data rates into this buffer and the output data rates of the devices receiving the image (audio) data.

Figure 3:
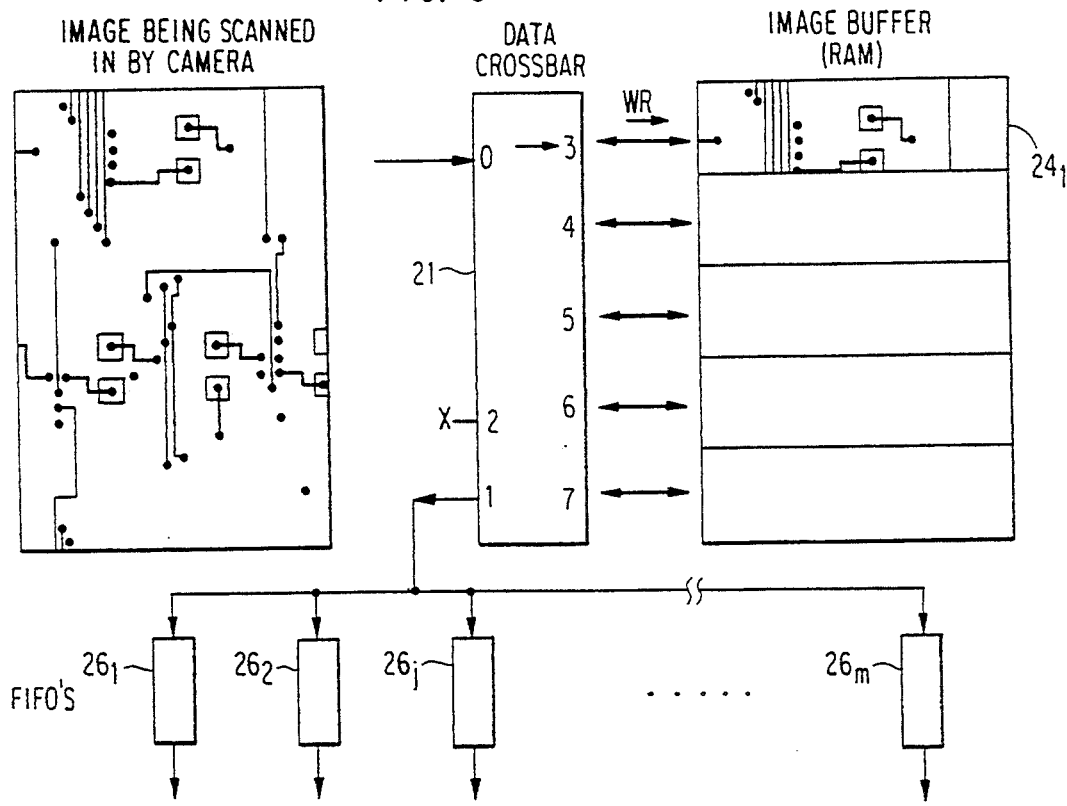
FIGS. 3, 4 and 5 are block diagrams, based on the block diagram of FIG. 2, showing the sequence of writing video data into RAM modules.
Figure 4:
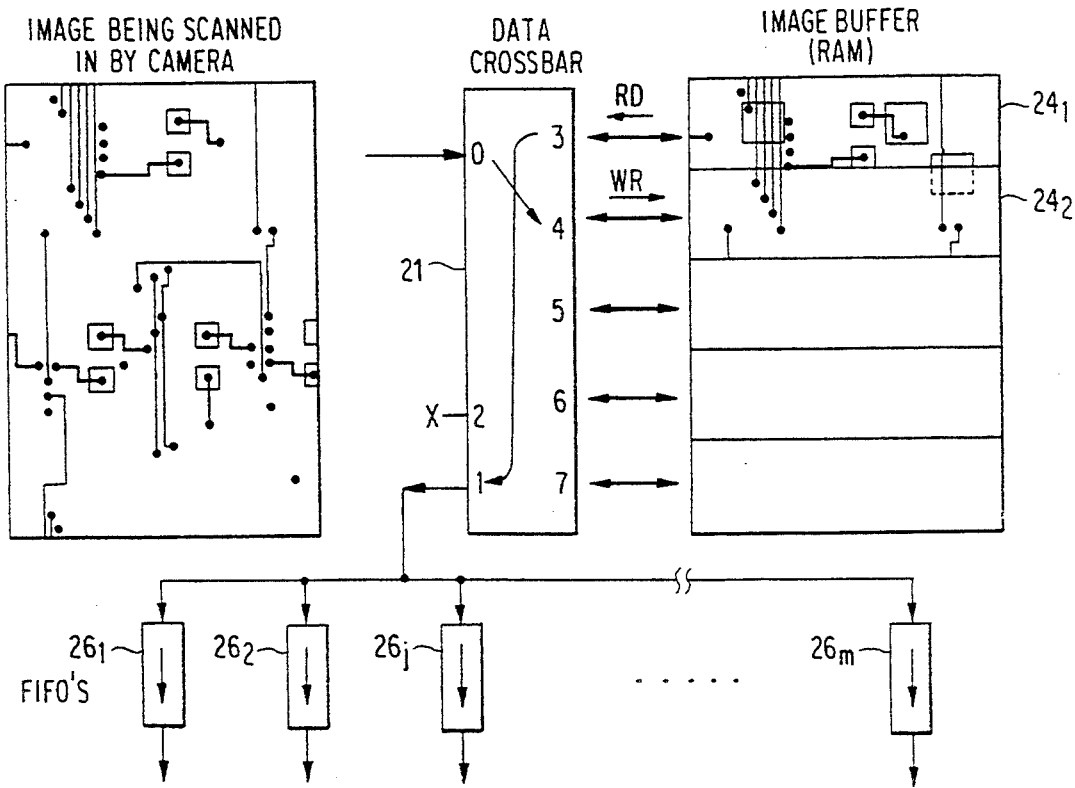
Figure 5:
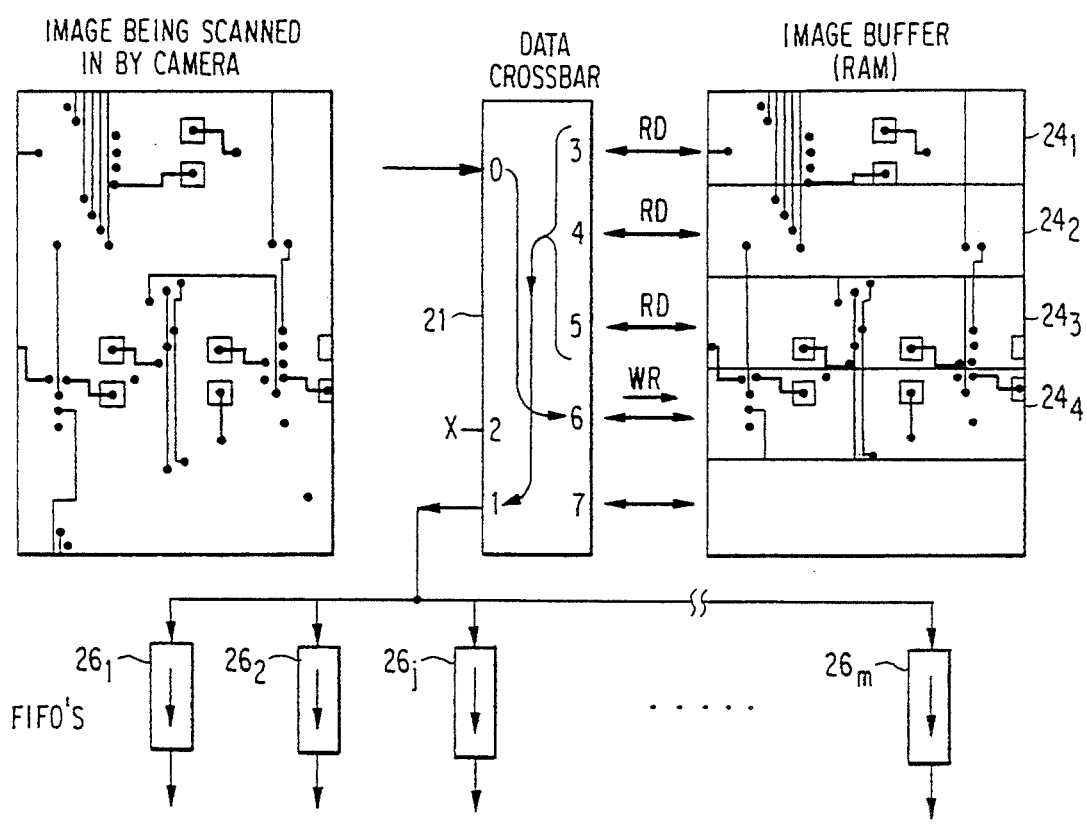

The incoming data are written into the crossbar switch 21 and sent to a particular RAM module, say module $24_1$, as shown in FIG. 3. In the case illustrated, a printed circuit board (PCB) is scanned by a video camera in an inspection system. When this RAM module $24_1$ becomes filled, the crossbar switch 21 switches the incoming data to succeeding RAM modules $24_2$, $24_3$, $24_4$, and $24_5$ as shown in FIGS. 4 and 5. These figures show the data being written into RAM modules in consecutive numerical order, but it will be understood that this is not a necessary condition for the practice of the invention. While data is being written into the second RAM module $24_2$ as shown in FIG. 4, data can be read from the first RAM module $24_1$, and sent to any one of FIFO registers $26_1$ to $26_m$. With many RAM modules individually selectable by the crossbar switch 21, different images can be sent to different output channels. It is even possible to go back and grab a previous image, for example, and send it out again. The key to the system is the control of the FIFO registers (i.e., loading particular data into them, sending data out, etc.) using the asynchronous queuing arbiter 27, shown in FIG. 2 and described in more detail hereinafter.

Figure 6:
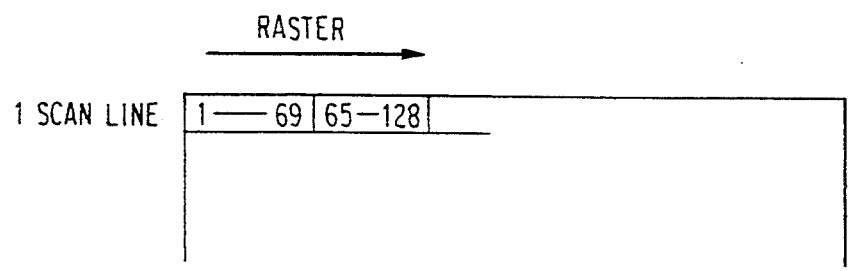
FIG. 6 is an illustration of an image being scanned by a CCD video camera.

FIG. 6 is an illustration of the format of an image being scanned by a video camera, such as a charge coupled device (CCD) camera. The image is inspected one raster line at a time, and data is sent out in serialized fashion starting with the left-most pixel first (bit 0). FIG. 7 illustrates the input shift register/latch circuitry to the crossbar switch 21. In the example illustrated, when sixty-four bits are serially sent out of the digitizer, they are stored. This is accomplished by serially loading the data into four 16-bit serial-in, parallel-out (SIPO) shift registers 31, 32, 33, and 34 under the control of a serial pixel clock 28. Once sixty-four bits are loaded, the four shift register outputs are latched by respective 16-bit latches 35, 36, 37, and 38. The serial pixel clock is divided by four in frequency divider 29 and counted by counter 30. As the next sixty-four bits are serially loaded into the shift registers, a 1:4 decoder 39 connected to the output of counter 30 enables one of the four "latched" 16-bit words to enter the input to the crossbar switch 21. Therefore, a 16-bit word (from the raster input) gets loaded into the multi-port video buffer 20 at ¼ the serial raster rate. This allows off-the-shelf RAM devices to be used.

FIGS. 8A and 8B illustrate how raster data is stored in a RAM module. FIG. 8A illustrates the case of a 2K pixel raster, and FIG. 8B shows a RAM module $24_i$ containing $127K \times 16$ cells. One scan line takes up 127 addresses of the RAM module $24_i$, with each address containing a 16-bit word. The RAM module $24_i$ contains 1K scan lines. Once the RAM module $24_i$ is filled up, the crossbar switch 21 switches to the next available RAM module to continue writing input data.

Figure 9A:
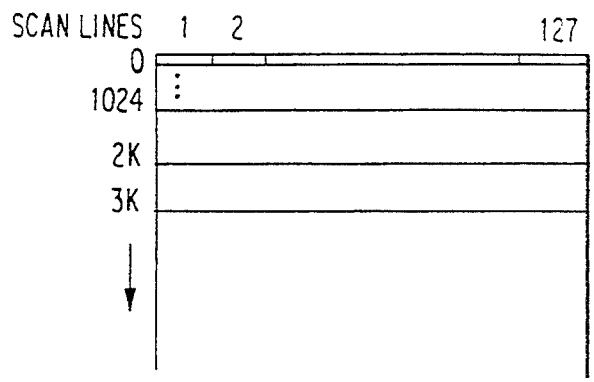
FIG. 9A is an illustration of scan lines and FIG. 9B is a block diagram of a crossbar switch connected to RAM modules showing how digital data is stored in the RAM modules.
Figure 9B:
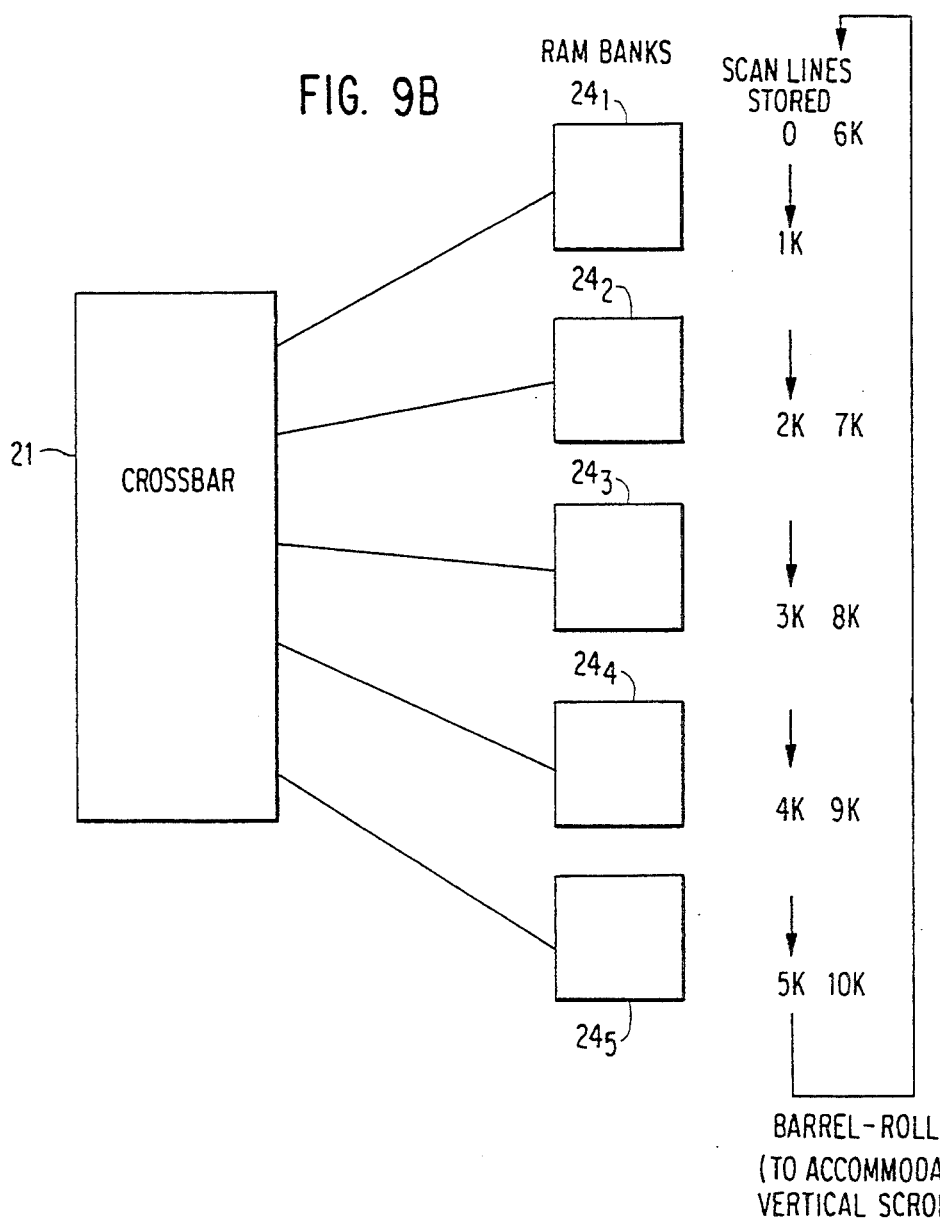

FIGS. 9A and 9B illustrate how the raster image data is stored in multiple RAM modules. FIG. 9A illustrates the formatted scan lines in 1K units. In FIG. 9B, the crossbar switch 21 is controlled to barrel-roll back to the first RAM module after all the previous RAM modules have been filled with image data.

Figure 10:
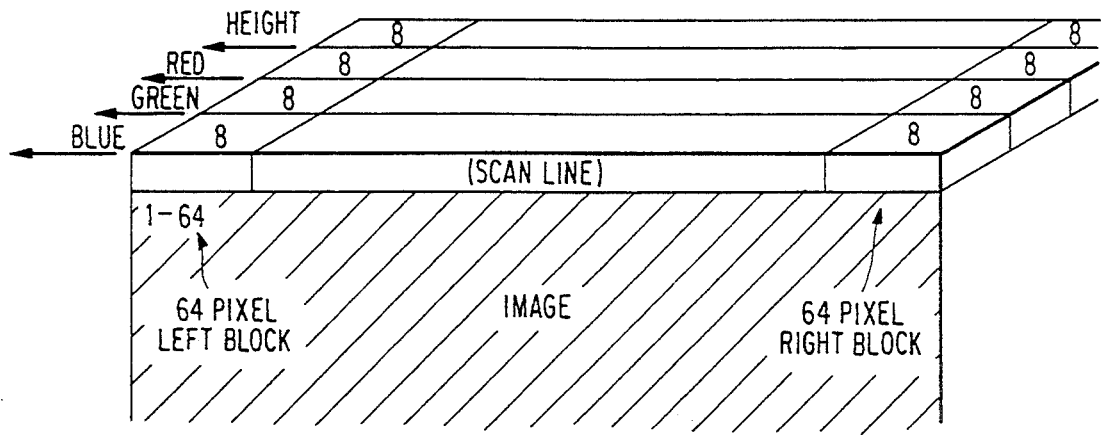
FIG. 10 is an isometric view of a portion of the data structure for a color 3D image.
Figure 11:
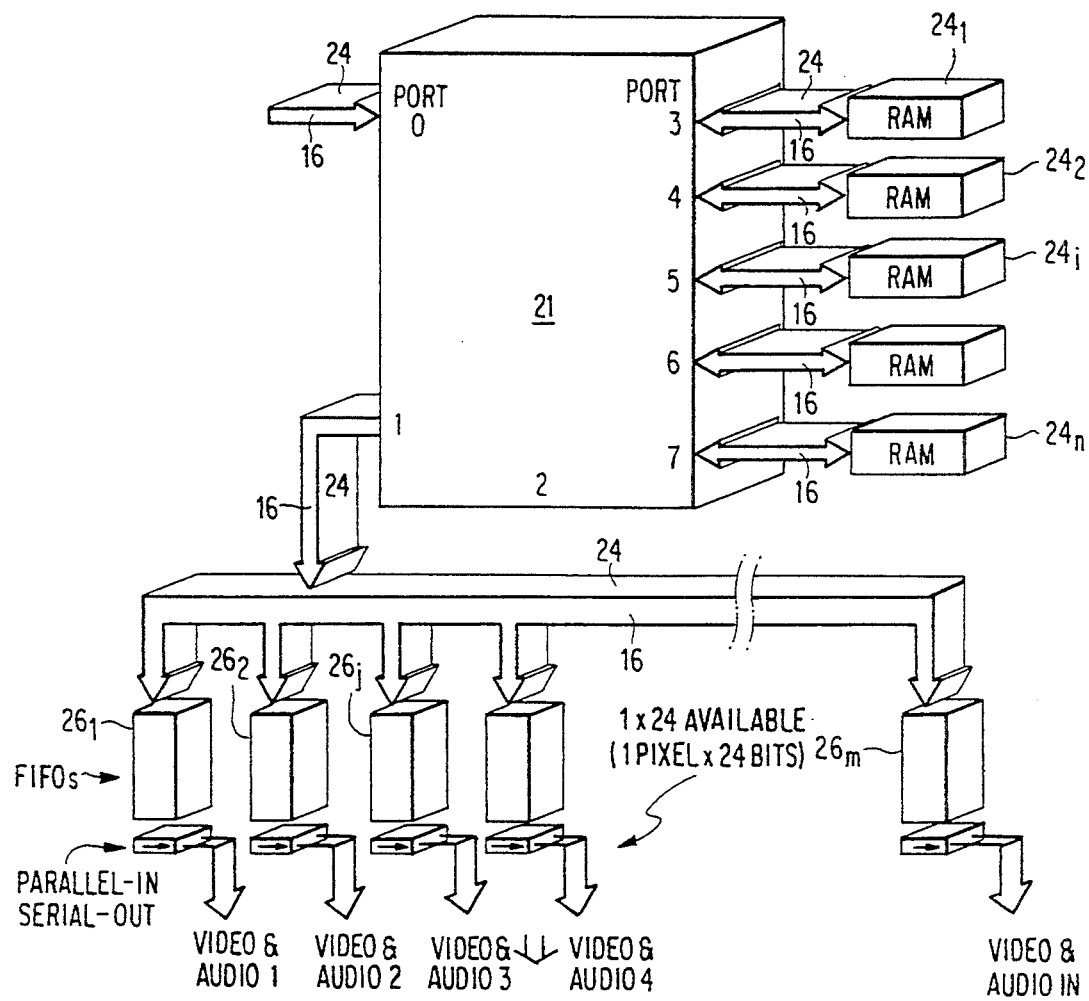
FIG. 11 is a block diagram of the multi-port buffer according to the invention.
Figure 12:
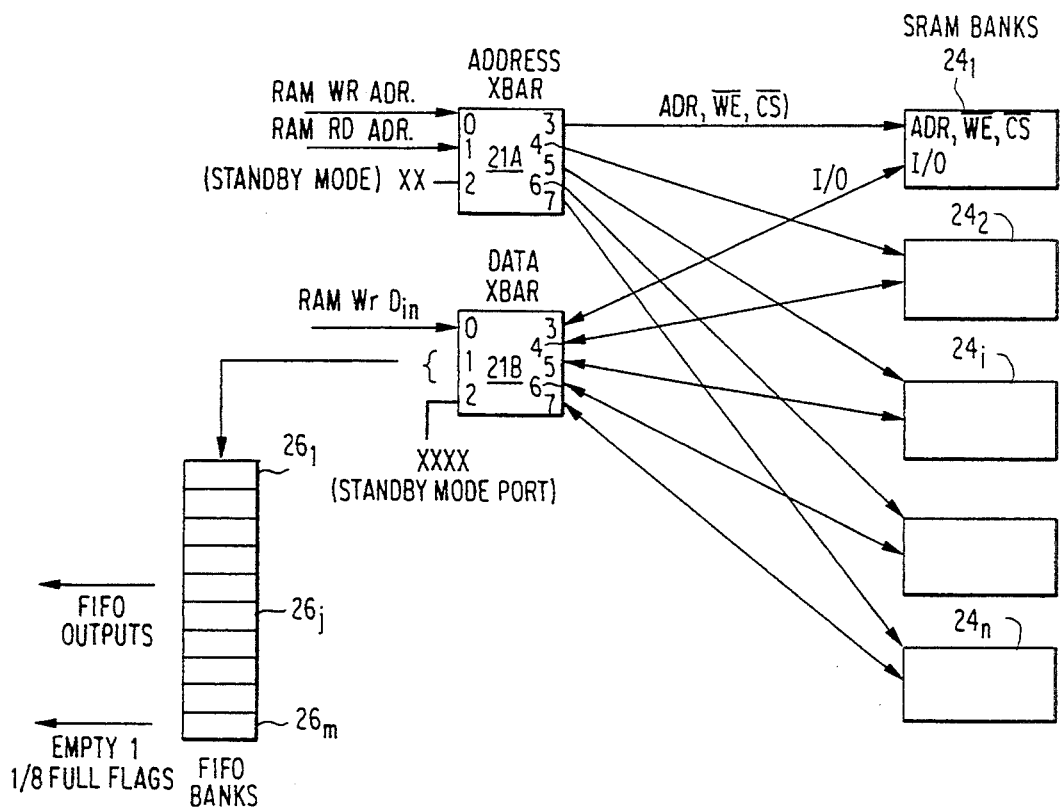
FIG. 12 is a block diagram showing both address and data crossbar switches.

In the case of black and white images, each pixel has a one byte (8-bit) representation. In the case of color or three dimensional (3D) images, each pixel can have a representation of three or more bytes. To accommodate color and/or 3D image dam, the input shift register/latch circuitry shown in FIG. 7 is replicated to handle all the bits of a pixel. FIG. 10 is an illustration of the data format for a color 3D image having four bytes for each pixel, each byte respectively representing blue, green, red, and height data. For color and/or 3D images, the multiple byte 16-bit words are loaded into the input port of the crossbar switch 21, as shown in FIG. 11. In fact, two sets of crossbar switches are needed; one for controlling the flow of data into and out of the RAM modules $24_1$ to $24_n$, the other for sending the write and read addresses to the RAM modules. This is shown in FIG. 12 where a separate crossbar switch 21A is used as an "Address Crossbar" and another crossbar switch 21B is used as a "Data Crossbar". These crossbar switches may be implemented, for example, using the TI SN74ACT8841 digital crossbar chip.

Figure 13:
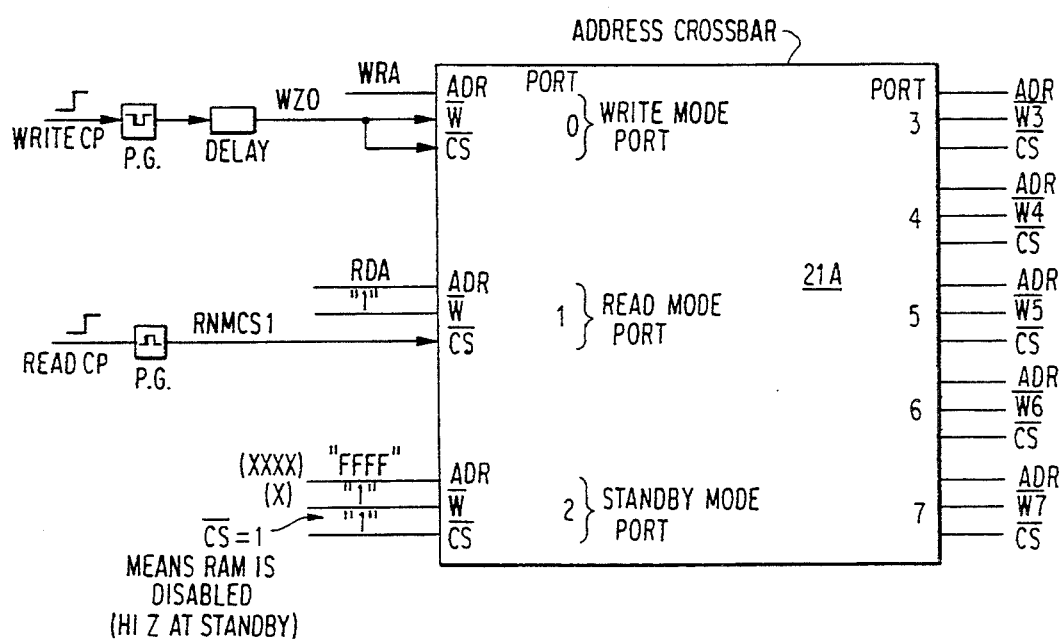
FIG. 13 is a high level block diagram of the address crossbar switch shown in FIG. 12.

FIG. 13 illustrates in more detail the Address Crossbar 21A. The RAM "Write" address, WRA, (for loading camera data into the correct spot in one of the RAM modules) is input into Port 0, the RAM "Read" address, RDA, (for loading an image from a RAM module $24_i$ to a FIFO register $26_j$) is input into Port 1. Port 2 is tied to logic level "1". Ports 3 through 7 each output to a respective one of a RAM module's address input. Along with write and read address inputs, a write enable signal and chip select signal is sent along with the respective address to control write and read operations of the RAM chips which make up the RAM modules.

Figure 14:
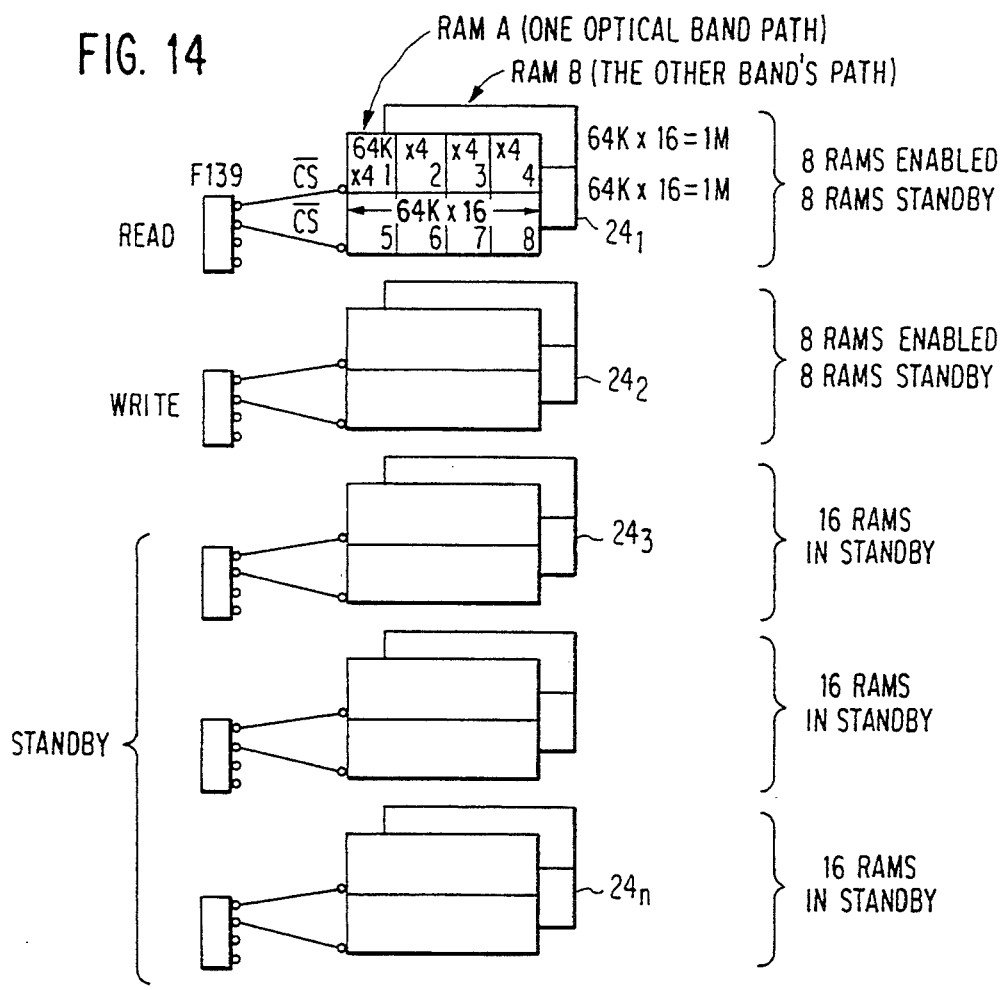
FIG. 14 is a block diagram of the RAM modules and illustrating power dissipation by the several RAM modules.

With one RAM module being written into and one RAM module being read from, the other RAM modules sit idle. To conserve power, these idle RAM modules can be temporarily switched into "standby" or "sleep" mode by having their chip select lines attached to Port 2's logic level 1. FIG. 14 illustrates one RAM module $24_2$ enabled for write mode, one RAM module $24_1$ enabled for read mode, and the other remaining RAM modules $24_3$ to $24_n$ in standby/sleep mode.

Figure 15:
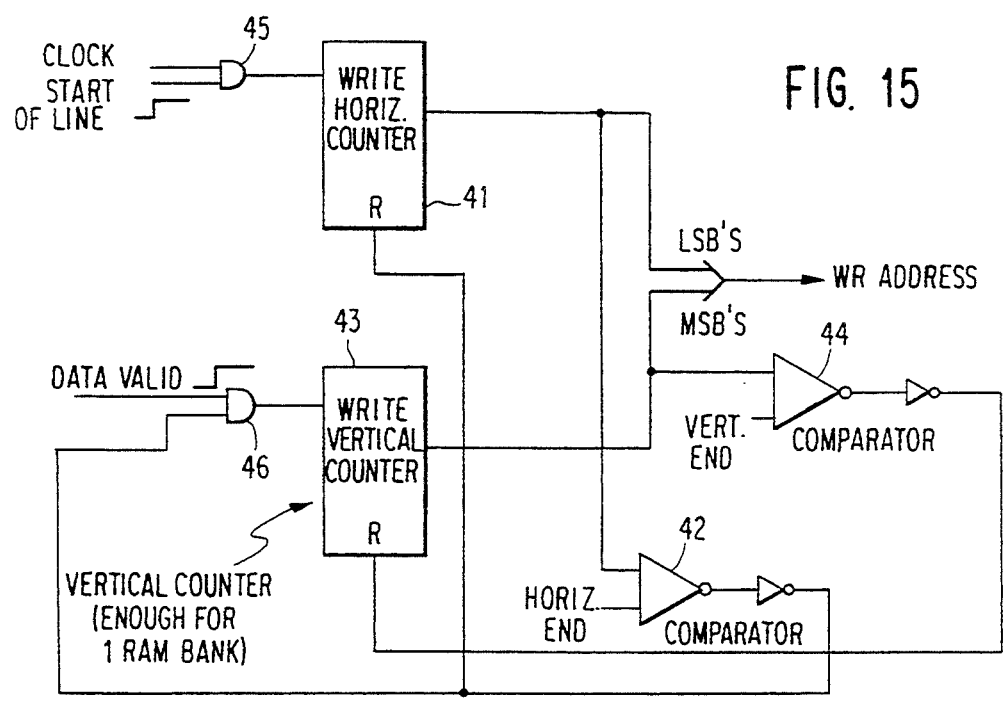
FIG. 15 is a block diagram of the horizontal and vertical counter and comparator circuit for generating addresses to the crossbar switches.

The write and read addresses are generated by respective pairs of horizontal and vertical counters. FIG. 15 shows a block diagram of the write counter. The write counter comprises a horizontal counter 41 that generates a RAM address for the horizontal coördinate of a pixel within a particular scan line. The write counter also comprises a vertical counter 43 that generates the RAM address for the vertical coördinate of the scan line being written into the RAM.

The horizontal counter 41 starts counting at the starting left-most pixel coördinate (in a raster format) and counts up until the counter reaches a count, $\Delta x$, the width of the image. This is identified by a comparator 42, which then increments the vertical counter 43 by one (to the next scan line) and resets the horizontal counter 41, to get ready for the next scan line. Because rasterized data is written into the crossbar switches as 16-bit words, the horizontal address counter 41 is clocked modulo-16 with respect to the serial pixel clock 28, shown in FIG. 7. The horizontal counter 41 will continue this operation until the vertical counter 43 reaches a count, $\Delta y$, the complete length of the image. The last scan line is detected by means of a comparator 44 which resets counter 43. The outputs of the horizontal counter 41 and the vertical counter 43 are combined to form the WRITE address. The output of the vertical counter 43 comprise the most significant bits (MSBs) and the output of the horizontal counter 41 comprise the least significant bits (LSBs) of the WRITE address.

As shown in FIG. 15, the WRITE horizontal and vertical counters/comparators are controlled by the camera signals. CCD video cameras typically generate a "start of line" (SOL) signal indicating that the camera has begun to scan the next raster line. This signal basically goes logic level "1" once the camera begins to scan and returns to logic level "0" when the camera finishes scanning. This signal is supplied to AND gate 45 which, when enabled, passes the clock pulses to horizontal counter 41. CCD cameras also typically generate a "data valid" (DV) signal to indicate the first and last valid pixels in the serialized raster data being sent out of the camera. This signal is a logic level "1" envelope during the active scan line portion; otherwise, the signal is at a logic level "0". This signal is supplied to AND gate 46 to allow incrementing of vertical counter 43 only during this envelope.

Figures 16, 16A:
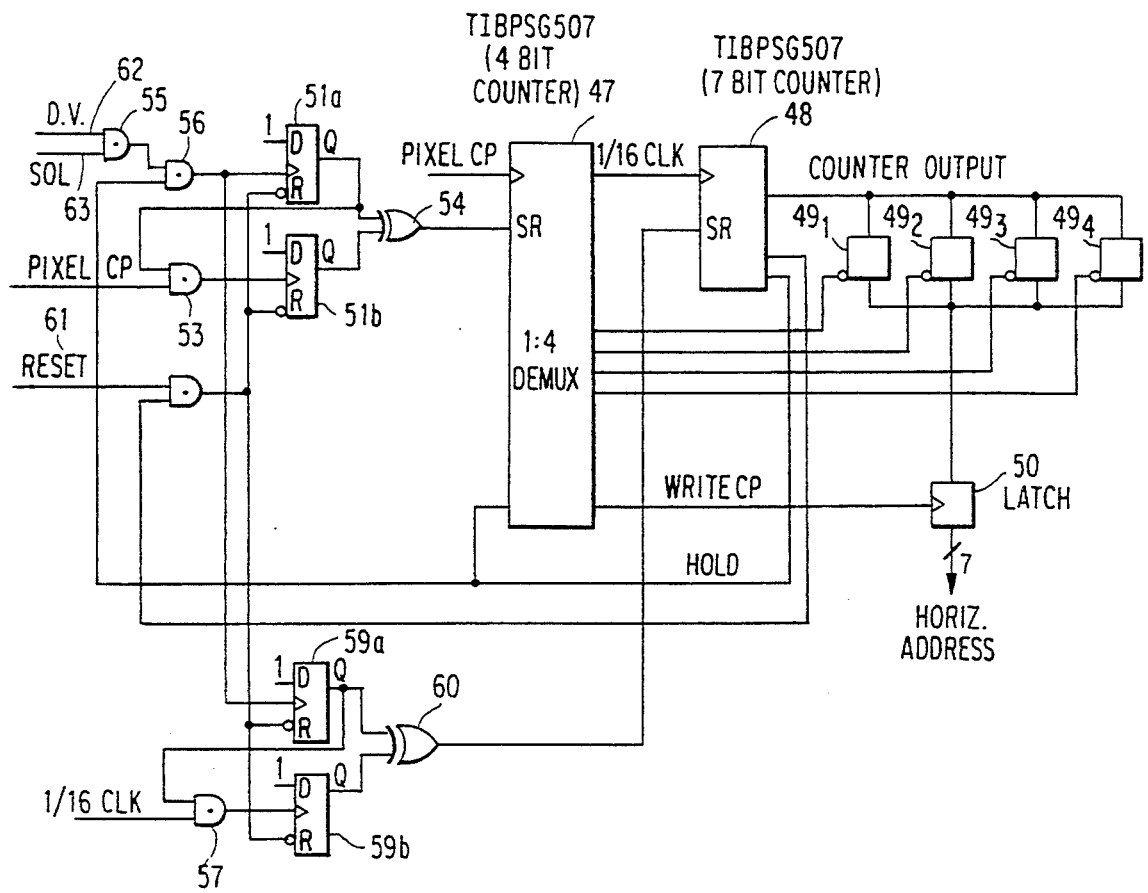
FIG. 16 is a block diagram showing in more detail the horizontal counter circuit.
FIG. 16A is a truth table showing the outputs of the state machine which is part of the horizontal counter circuit.

FIG. 16 illustrates the WRITE horizontal counter 41 circuitry in more detail. A comparison with FIG. 7 shows that the write address is generated, demultiplexed and latched out in a similar manner to how the write data is demultiplexed and latched out. This is done to have the write data and address clocked into their respective crossbar switches synchronously. The 64-bit pixel word of FIG. 6 is serially loaded into the shift register/latch circuit of FIG. 7. When the first 64-bit word is latched, the next 64-bit word is serially loaded in the shift register, and at the same time, one of the four 16-bit words in the latches is demultiplexed out of the latches at a rate of ¼ the pixel clock rate into the crossbar switch 21B. Along with this data, the address for the data is passed to crossbar switch 21A so that the data can be written into a RAM module $24_i$.

The write horizontal address count circuit shown in FIG. 16 operates as follows. At the start of a line about to be scanned, flip-flops 51a, 51b, 59a, and 59b are reset by the reset signal on line 61. With flip-flop 51a output at logic level "0", AND gate 53 disables the serial clock into flip-flop 51b. Also, with a logic level "0" on the flip-flop outputs, the Exclusive OR gates 54 and 60 also output logic level "0" which then feed the synchronous reset (SR) inputs of counters 47 and 48, respectively, so that the counters are reset with the next clock pulse. The counters remain in the reset state until the synchronous reset signal goes high as a result of a change in the output of Exclusive OR gates 54 and 60.

After reset, when the camera begins to start to scan, the "data valid" (DV) signal on line 62 is a logic level "1" enabling AND gate 55. Then the start of line (SOL) pulse on line 63 is passed by AND gates 55 and 56 to clocking flip-flops 51a and 59a. The outputs of these flip-flops respectively force the outputs of Exclusive OR gates 54 and 60 to logic level "1", thus disabling the synchronous reset on counters 47 and 48 enabling the counters to begin to count. In a preferred implementation of the invention, the counters 47 and 48 are constructed using the Texas Instruments (TI) TIBPSG507 programmable sequence generator chip.

Counter 47 counts from zero to fifteen at the serial or pixel clock rate. Counter 47, being constructed from the TI TIBPSG507 programmable sequence generator chip, allows the programming of various output states, depending on the count; e.g., the counter functions as a state machine. The outputs of this state machine are shown in the table of FIG. 16A. On every fourth count, signal WRITECP is pulsed to clock from latch 50 the 7-bit camera data address at ¼ the serial clock rate. Counter 47 also generates four enable lines, acting as a 1:4 demultiplexer to enable only one of the four tristate latches $49_1$ to $49_4$ at a time, each for a period of four pixel clock periods. The cycle repeats every sixteen pixel clocks. Counter 47 also generates a clock pulse once every sixteen pixel clocks and sends this as a clock pulse to counter 48. This provides the address generation at a rate of modulo-16 to the pixel clock rate. Counter 48 actually generates the horizontal RAM address.

Figure 17A:
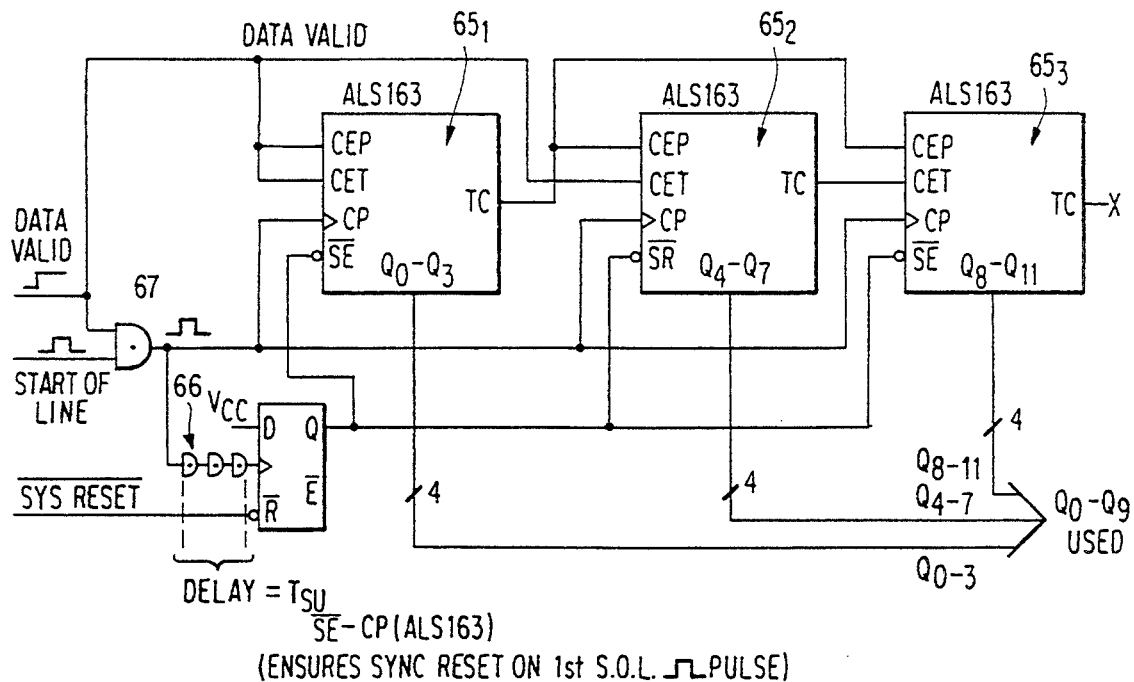
FIGS. 17A, 17B and 17C, taken together, form a block diagram showing in more detail the vertical counter circuit.
Figure 17B:
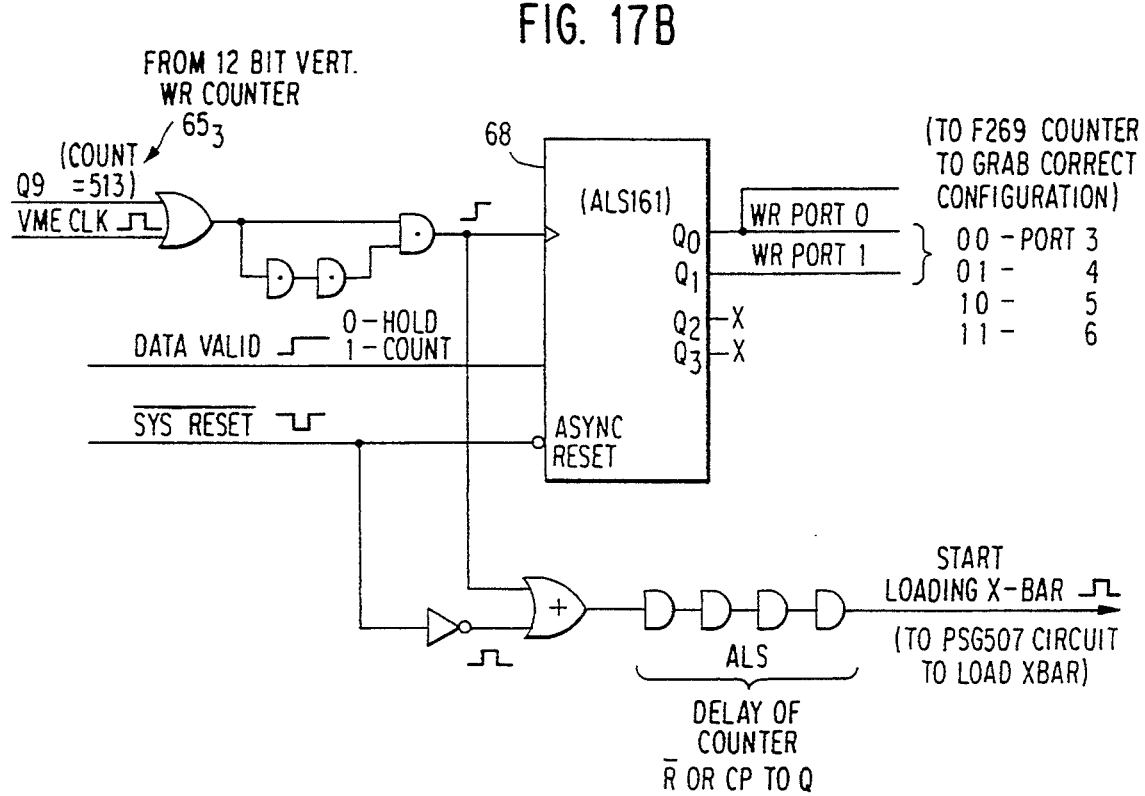
Figure 17C:
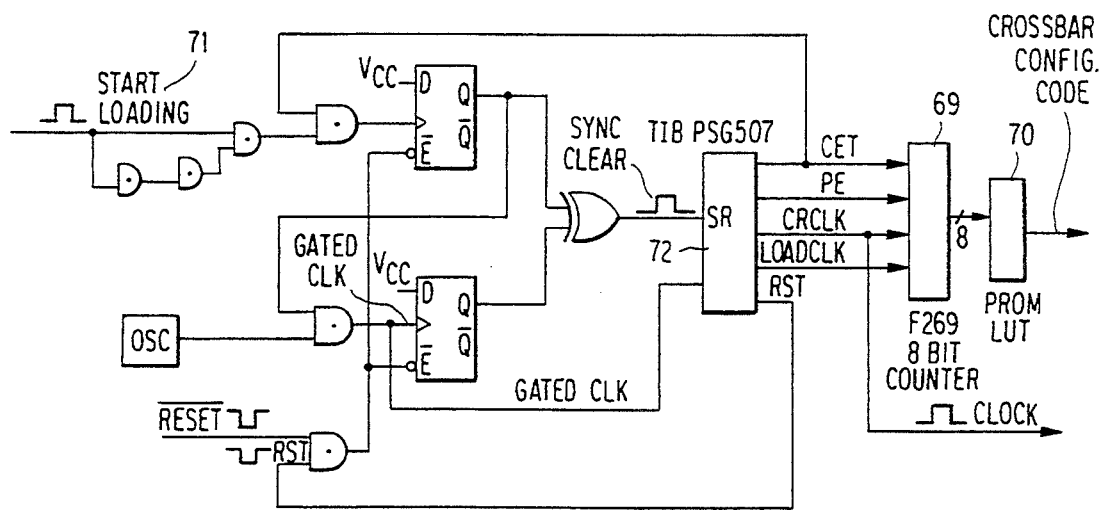

The WRITE vertical counter circuitry is shown in more detail in FIGS. 17A to 17C. This circuit comprises three sections; the vertical RAM address generator within a RAM module as shown in FIG. 17A, the write port number counter as shown in FIG. 17B, and the crossbar code loading circuit as shown in FIG. 17C.

Figure 17D:
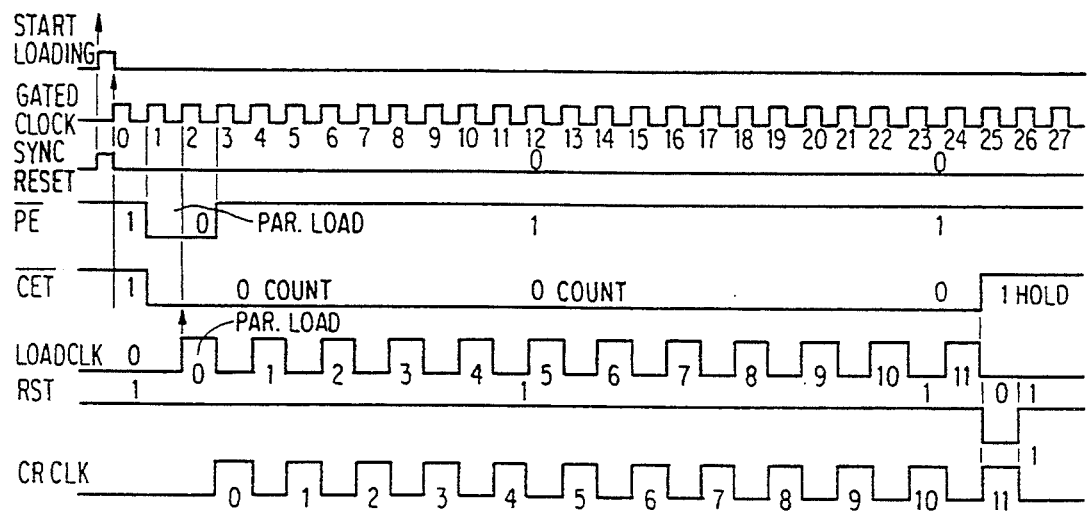
FIG. 17D is a timing diagram showing the operation of the vertical counter circuit.

FIG. 17D is a timing diagram illustrating the operation of the latter circuit.

Referring first to FIG. 17A, the vertical RAM address generator basically counts zero to 1023 scan lines; i.e., the number of scan lines to fill up one RAM module. Counters $65_1$ to $65_3$ are each 4-bit counters, such as TI's SN74ALS163 chip, cascaded together as shown. These counters have a synchronous reset (SR). At the beginning of the scanning of an image by the CCD camera, the system reset signal resets the output of flip-flop 64 to a logic "0". At the beginning of CCD scanning, the DV (data valid) signal goes high and the SOL (start of line) signal is pulsed causing the counters to be synchronously reset by the next clock pulse. The SOL signal pulse is delayed into the clock input of flip-flop 64 by gates 66 to ensure the clock arrived at the counters $65_1$ to $65_3$ before the flip-flop disables the synchronous reset signal to the counters.

FIG. 17B illustrates the WRPORT number counter circuit 68. This circuit counts and keeps track of what crossbar port data is being written into. This is necessary so that, as data is being written into the RAM modules, the crossbar switch can switch from RAM module to RAM module, essentially scrolling vertically down the image. Having the vertical counter control the switching configurations of the crossbar switch is necessary to perform this vertical scrolling. Upon system reset, counter 68 resets to zero and crossbar switch configuration is loaded for WRPORT=00, which in this implementation means that RAM module 0 attached to crossbar port 3 is written into. When the most significant bit (MSB), $Q_9$, of the vertical counter $65_3$ (FIG. 17A) becomes logic level "1" corresponding to scan line 513, this indicates that the RAM module on is half filled. This MSB line is sent to the WRPORT number counter circuit 68, which increments the counter and then loads in the next crossbar configuration which, in this example, is WRPORT=01, meaning that RAM module 1 attached to crossbar port 4 will be written into next.

In using the TI SN74ACT8841 digital crossbar chip, in order to switch the RAM module into which data is written, it is necessary to dynamically reconfigure the crossbar switch in real time. The SN74ACT8841 chip has eight configuration registers on-chip. Each time a configuration is loaded into the chip, it is loaded into only four of the registers. When the counter 68 increments, to prepare for a switch of writing to a different RAM module, it loads the next crossbar configurations into the next four registers. Thus, when the vertical counter counts beyond one RAM module (i.e., past 1024 scan lines for that module), it loads the next crossbar configurations into the next four registers to choose the correct crossbar configuration. This particular crossbar chip can do this at a rate faster than most pixel clock rates, namely, 12 nsecs. or 83.3 MHz, thus reconfiguring the crossbar in real time.

Referring next to FIG. 17C, the start loading signal on line 71 causes the programmable sequence generator 72 (TI chip TIBPSG507) to be triggered which then loads the crossbar configuration for the particular next WRPORT number. It does this by sending an address to a crossbar configuration lookup table 70, preferably implemented with a programmable read only memory (PROM). The timing diagram of FIG. 17D shows the inputs to the circuit and the outputs of the programmable sequence generator 72. The output of the PROM 70 and the CRCLK signal from the programmable sequence generator 72 are sent directly to the crossbar switches, and the crossbar configurations are loaded into the four next configuration registers on the crossbar chip.

Figure 18A:
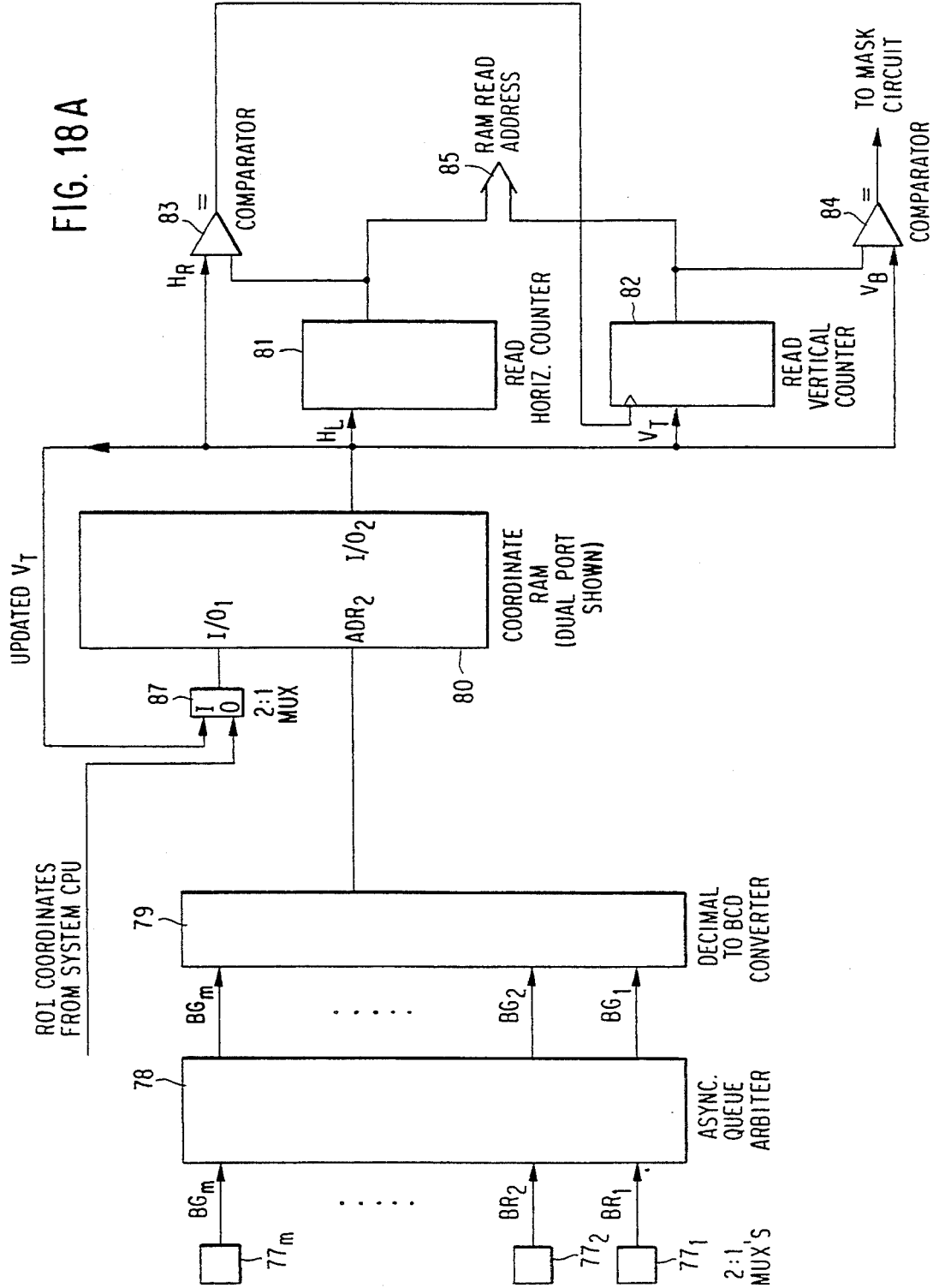
Figure 18B:
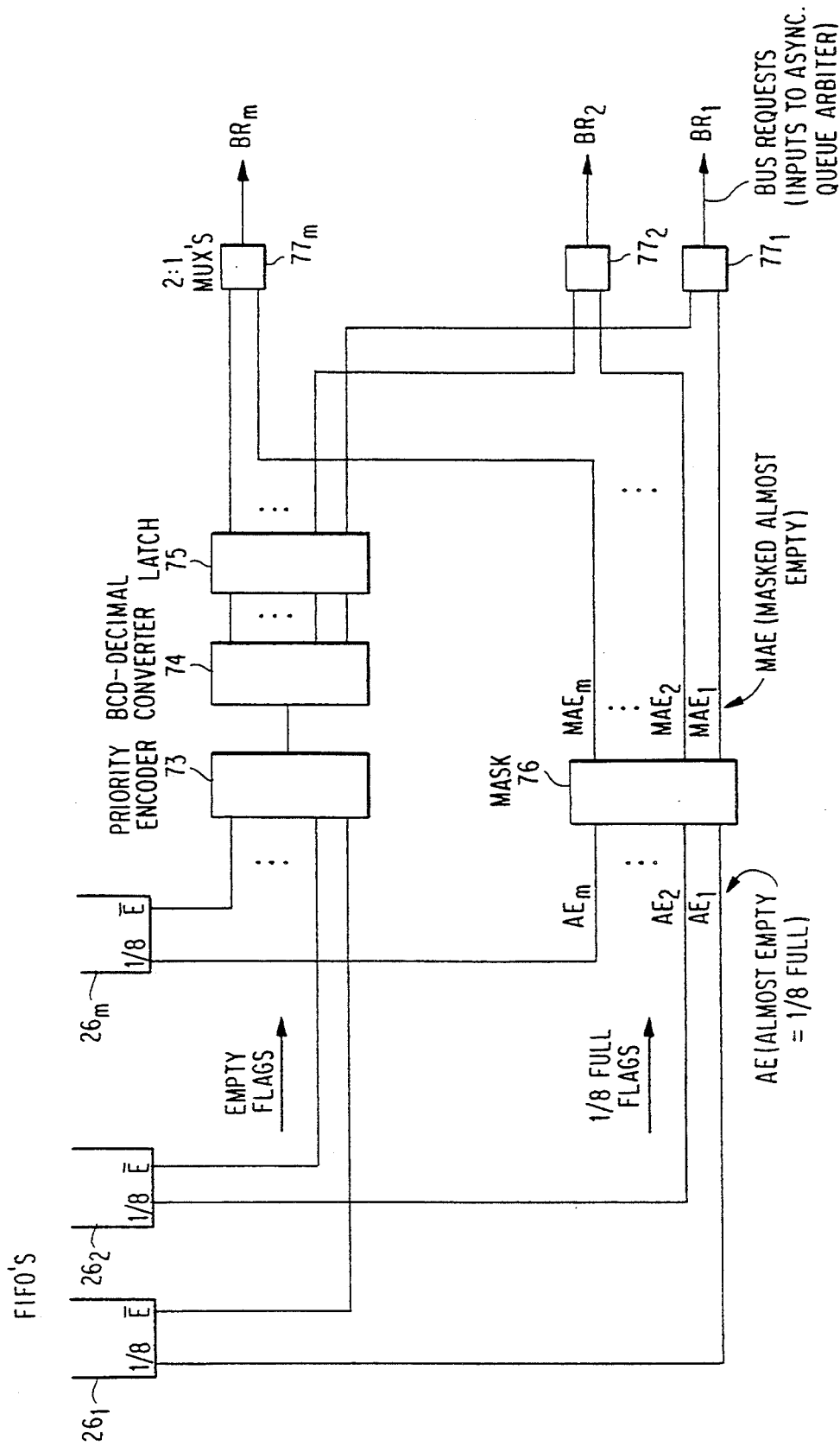

FIGS. 18A, 18B and 18C illustrate the details of the asynchronous queuing arbiter 27, shown in FIG. 2. The asynchronous queuing arbiter controls the RAM READ operations to output data to the FIFO registers. Horizontal and vertical counters and comparators of nearly the identical circuit used for the WRITE address generation are also used for READ address generation. The only difference is that the left/right horizontal coördinates and top/bottom vertical coördinates are generated by the system CPU or a bit-slice arithmetic logic unit (ALU), depending on the specific application. The four coördinates are generated and saved in a coördinate RAM 80 as shown in FIG. 18A. In other words, the queuing arbiter chip 78 dictates which FIFO register is loaded with a ROI (region of interest) image data by selecting the appropriate frame coördinates from the coördinate RAM 80 which sends them to the READ horizontal counter 81 and the READ vertical counter 82 and respective comparators 83 and 84.

Referring to FIG. 18B, each FIFO register $26_i$ corresponds to a different image (or audio) output. Each FIFO register must therefore be large enough to hold 1⅛ scan lines of the particular ROI and be able to accept the scan line information by sixteen bits at a time (i.e., a 2-byte wide format). Each FIFO register has two flags that are constantly sensed by the asynchronous queuing arbiter; namely, an empty flag and a ⅛ full (e.g., almost empty) flag. At the beginning of an image scan, when the reset signal is enabled, all the FIFO registers are cleared enabling their respective empty flags. When an empty flag is enabled, it means that the particular FIFO register is available for a new image frame. The FIFO empty flags are input to a priority encoder chip 73. In the case when all FIFO registers are empty,. e.g., after a reset, the priority encoder chip 73 enables only one input; that is, the highest priority input. To keep things simple, FIFO register $26_1$ is assigned the highest priority, and FIFO register $26_m$ is assigned the lowest priority. The priority encoder's binary coded decimal (BCD) outputs are converted to decimal by a BCD-to-binary converter 74 so there is a signal for each FIFO register. These outputs are latched by latch 75 and sent to a respective 2:1 multiplexer $77_1$ to $77_m$ in FIG. 18A for the corresponding FIFO register.

In the case when a scan line, within a FIFO register, has been shifted out to the point where only ⅛ of the scan line is left, the FIFO register's ⅛ full flag becomes active. The shift out clock rate of the particular FIFO register is determined by the destination device receiving the ROI image dam; i.e., the image processor or other device. The ⅛ full flag is used to request a "refill" of the next scan line of that particular ROI to prevent the FIFO register from becoming empty before receiving the next scan line. If the FIFO register became empty before receiving the next scan line, it would indicate that the ROI image has been completed, and the resulting empty flag would request a new image frame.

Referring back to FIG. 18A, the 2:1 multiplexers $77_1$ to $77_m$ select whether an empty flag, indicating that the respective FIFO register is available for a new image frame, or a ⅛ full (almost empty) flag, indicating the respective FIFO register currently has a frame but needs the next scan line of data from the RAM modules, will be used as the "bus request" (labelled $BR_1$ to $BR_m$) input to the asynchronous queue arbiter chip 78. The mask circuit 76, shown in FIG. 18B, disables a particular ⅛ full flag when that particular FIFO register is on the last scan line of its image. That way, it does not request another scan line from RAM. Instead, that FIFO register will go empty, enabling the empty flag, indicating that the FIFO register is available for a new image frame.

The bus request inputs $BR_1$ to $BR_m$, enter the asynchronous queue arbiter chip 78, shown in FIG. 18A. The preferred embodiment of the invention uses a 74F786 Asynchronous Bus Arbiter chip manufactured by Signetics for the asynchronous queue arbiter chip 78, although many other commercially available chips can be used to accommodate the variable number of m inputs. Basically, the asynchronous queue arbiter chip 78 determines priority of arbitration on a first-come, first-served basis. Separate bus grants (labelled $BG_1$ to $BG_m$) are output to indicate which one of the request inputs is served by the arbitration logic inside the chip. The output is sent to a decimal-to-BCD converter 79 which converts the M inputs into a binary representation. This binary representation is used as an address into the coördinate RAM 80. This address tells the coördinate RAM 80 which FIFO needs a scan line. The coördinate RAM 80 outputs the particular image frame coördinates, namely HL (horizontal left), HR (horizontal right), VT (vertical top or scan line of interest) and VB (vertical bottom or last scan line of image). The coördinates are loaded into the read horizontal counter 81 and comparator 83, and read vertical counter 82 and comparator 84.

As mentioned earlier, the READ horizontal/vertical counters/comparators used to generate the READ addresses for a ROI are built nearly identical to the WRITE counters/comparators, as shown in FIG. 16. The horizontal counter 81 counts from left to right along a scan line. Once it reaches the end of a scan line and activates an enabled output from comparator 83, which increments the vertical counter 82. Once vertical counter 82 has been incremented, VT is stored back in the coördinate RAM 80 for future use, as when requested to send out the next scan line to the FIFO. The updated VT signal passes through a 2:1 multiplexer 87. The other input to the 2:1 multiplexer 87 is a line from the system CPU that generates the original ROI coördinates. This is why a dual port ram is a desirable component for the coördinate RAM 80. Typically the System CPU loads the coördinate RAM 80 with various ROI coördinates at system start-up and occasionally as ROI images have been completely sent out from the FIFO registers. Also VT updates can occur simultaneously to Bus Requests demanding ROI image coördinates from the coördinate RAM 80.

FIG. 18C illustrates in detail the construction of the mask circuit 76 shown in FIG. 18B. As previously mentioned, the purpose of the mask circuit 76 is to disable a particular FIFO register's ⅛ full flag when the FIFO register is on its last scan line. That way, the FIFO register unloads the last scan line and becomes empty, enabling the empty flag which then is received by the asynchronous queue arbiter chip 78 asking for a new image frame. As shown in FIG. 18C, the read vertical count from the vertical counter 82 is compared to VB (vertical bottom or last scan line of the ROI image) by comparator 84. When the count equals VB, the comparator 84 output becomes enabled (low active). This low active signal is sent to multiple mask circuits $86_1$ to $86_m$). Each mask circuit "ANDs" the respective ⅛ full flag (or almost empty $AE_i$) to the comparator output and then adds the ANDed output to the inverted output of the comparator via an OR gate. As a result, output MAE (masked almost empty flag) will appear to equal the AE output (⅛ full flag) when the vertical count does not equal VB and equal a logic level "1" when the vertical count equals VB. As shown in FIG. 18B, these MAE outputs are sent to 2:1 multiplexers $77_1$ to $77_m$ which then are sent as inputs to the asynchronous queue arbiter chip 78. In the event that one particular output has a slower or variable speed clock, the order of which a FIFO register gets refilled next changes. That is the reason for an asynchronous queuing system as contrasted with a synchronous or "round robin" system. This is also very convenient for those desiring a "fault tolerant" system. In the event that one channel becomes faulty, there are other channels from which to select. It is only necessary to disable the bus request (the ⅛ full flag) for that FIFO register to prevent it from asking for any more RAM READ operations.

In applications where one is not concerned with ROI images overlapping into multiple RAM modules, one could eliminate the use of a crossbar switch. Instead, a dual port RAM could be used allowing simultaneous write and read operations. This approach is a more economical method of implementation but not as forgiving for ROI image characteristics. In applications where one does not expect the order of FIFO register requests to change with relation to the start (where the priority encoder selects FIFO register $26_1$ first, then FIFO register $26_2$, then FIFO register $26_3$, etc), one could use a round-robin type approach instead of an asynchronous queue system. Actually the asynchronous queuing arbiter will act as a round-robin control in a synchronous system. Application characteristics of a synchronous system (or round-robin control) are that all ROI images are of the same size and all ROI images are transmitted out of the FIFO registers at the same clock speed.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A high performance asynchronous input/output video image buffer for providing multiple image frames asynchronously and simultaneously to a plurality of video image output devices in parallel, said video image buffer comprising:

a single input means for receiving a plurality of digitized video input signals from one or more sources;

random access memory means for storing said digitized video input signals;

a plurality of first-in, first-out registers for temporarily storing data read out of said random access memory means, each of said plurality of first-in, first-out registers having a capacity greater than a predefined quantity of data and generates an empty flag when empty and an almost empty flag when said predefined quantity of data has been read out;

write address means for generating write addresses for said random access memory means;

read address means for generating read addresses for said random access memory means;

address switching means for muting write and read addresses to said random access memory means;

data switching means for routing said received video signals into write addressed locations of said random access memory means and for routing data read out of said random access memory means to said plurality of first-in, first-out registers;

asynchronous queuing arbiter means responsive to said plurality of first-in, first-out registers for controlling said address and data switching means, said asynchronous queuing arbiter means being responsive to said empty and almost empty flags to respectively begin to read a new frame of data into a corresponding register or to refill the register from a continuing frame of data read out of said memory means, the order and rate at which data is read out of the memory means to the first-in, first-out registers being controlled by said asynchronous queuing arbiter by monitoring flags from the first-in, first-out registers; and output means connected to said plurality of first-in, first-out registers for simultaneously transferring parallel data frames, from said first-in, first-out registers to a plurality of output channels asynchronously and in parallel, wherein if one of the output channels is slower than the others or operates at a variable clock speed, the asynchronous queuing arbiter means changes the order in which the first-in, first-out registers are filled to accommodate that output channel.

2. The high performance asynchronous input/output buffer recited in claim 1 wherein said address switching means and said data switching means each comprise a crossbar switch and wherein said address switching means crossbar switch and said data switching means crossbar switch perform write and read accesses to said random access memory means at different address locations.

3. The high performance asynchronous input/output buffer recited in claim 1 wherein said asynchronous queuing arbiter means comprises:

a coördinate memory for storing left/right horizontal coördinates and top/bottom vertical coördinates;

a horizontal counter and a vertical counter respectively connected to receive horizontal and vertical data outputs from said coördinate memory;

horizontal and vertical comparators respectively connected to receive outputs from said horizontal and vertical counters and from said coördinate memory, an output of said horizontal comparator being connected to said vertical counter to initiate counting by the vertical counter; and mask circuit means connected to receive almost empty flags from said first-in, first-out registers and an output from said vertical comparator, whereby said asynchronous queuing arbiter means controls dictates which first-in, first-out register is loaded with a region of interest image data by selecting the appropriate frame coördinates from the coördinate memory.

4. The high performance asynchronous input/output video image buffer recited in claim 1 wherein said plurality of first-in, first-out registers for simultaneously transferring M parallel data frames, each at a rate $O_{ri}$, from said first-in, first-out registers to a plurality of M output channels in parallel wherein the combined output rate is and the following relationship is satisfied:

$$(N)(I_r) \leq (M)(O_r).$$

* * * * *